(12) United States Patent
Peyrl et al.

(10) Patent No.: US 10,199,915 B2
(45) Date of Patent: Feb. 5, 2019

(54) NETWORKED CONTROL OF A MODULAR MULTI-LEVEL CONVERTER

(71) Applicant: ABB Schweiz AG, Baden (CH)

(72) Inventors: Helfried Peyrl, Zürich (CH); Silvia Mastellone, Nussbaumen (CH)

(73) Assignee: ABB Schweiz AG, Baden (CH)

( * ) Notice: Subject to any disclaimer, the term of this patent is extended or adjusted under 35 U.S.C. 154(b) by 229 days.

(21) Appl. No.: 15/229,787

(22) Filed: Aug. 5, 2016

(65) Prior Publication Data
US 2016/0344277 A1    Nov. 24, 2016

Related U.S. Application Data

(63) Continuation of application No. PCT/EP2015/051978, filed on Jan. 30, 2015.

(30) Foreign Application Priority Data

Feb. 7, 2014 (EP) ................................ 14154272

(51) Int. Cl.
*H02M 1/08* (2006.01)
*H02M 7/5387* (2007.01)
*G05B 13/04* (2006.01)
*H02M 7/483* (2007.01)

(52) U.S. Cl.
CPC ............ *H02M 1/08* (2013.01); *G05B 13/048* (2013.01); *H02M 7/53873* (2013.01); *H02M 2007/4835* (2013.01)

(58) Field of Classification Search
CPC .... H02M 1/08; H02M 7/53873; G05B 13/048
See application file for complete search history.

(56) References Cited

U.S. PATENT DOCUMENTS

| | | | |
|---|---|---|---|
| 2003/0197426 A1* | 10/2003 | Carson ................. | H04B 3/54 307/40 |
| 2009/0024231 A1* | 1/2009 | Ji ........................ | H04L 1/0036 700/67 |
| 2012/0127673 A1* | 5/2012 | Ledezma .............. | H02M 7/003 361/730 |

(Continued)

OTHER PUBLICATIONS

European Patent Office, International Search Report & Written Opinion issued in corresponding Application No. PCT/EP2015/051978, dated Apr. 22, 2015, 14 pp.

(Continued)

*Primary Examiner* — Mohammad Ali
*Assistant Examiner* — Vincent W Chang
(74) *Attorney, Agent, or Firm* — J. Bruce Schelkopf; Taft Stettinius & Hollister LLP

(57) ABSTRACT

A method for controlling a modular multi-level converter comprises the steps of: collecting control input variables from the converter; transmitting the control input variables to a controller of the converter via a first communication medium; determining, in the controller, and actual state of the converter and at least one control output variable based on a model of the converter; and transmitting the control output variable to the converter for controlling the converter via a second communication medium. The model of the converter accounts for the first and/or the second communication medium.

13 Claims, 3 Drawing Sheets

(56) References Cited

U.S. PATENT DOCUMENTS

2012/0314466 A1    12/2012    Goerges et al.

OTHER PUBLICATIONS

European Patent Office, Extended Search Report issued in corresponding Application No. 14154272.0, dated Jul. 28, 2014, 10 pp.
Fard et al., "Analysis of a Modular Multilevel Inverter Under the Predicted Current Control Bases on Finite-Control-Set Strategy," 3rd International Conference on Electric Power and Energy Conversion Systems, Istanbul, Turkey, Oct. 2-4, 2013, 6 pp.
Huang et al. "Analysis of Communication Based Distributed Control of MMC for HVDC," 15th European Conference on Power Electronics and Applications (EPE), (IEEE, Sep. 2, 2013, pp. 1-10.
Liu et al., "Networked Predictive Control of Systems With Random Network Delays in Both Forward and Feedback Channels," IEEE Transactions on Industrial Electronics, vol. 54, No. 3, Jun. 2007, pp. 1282-1297.
Liu et al., "Improved Networked Predictive Control with Different Transmission Delays in both Forward and Feedback Channels," The 2nd International Conference on Intelligent Control and Information Processing, Jul. 25-28, 2011, pp. 604-609.
Qin et al., "Predictive Control of a Three-Phase DC-AC Modular Multilevel Converter," Energy Conversion Congress and Exposition (ECCE), IEEE, Sep. 15, 2012, pp. 3500-3505.
Tian et al., "Quantized output feedback control for networked control systems," Information Sciences, vol. 178, No. 12, Jun. 15, 2008, pp. 2734-2749.
Bao-Cang et al., "Chapter 1: Systems, modeling and model predictive control," Modern Preditive Control, CRC Press, 2009, pp. 1-36.

\* cited by examiner

NETWORKED CONTROL OF A MODULAR MULTI-LEVEL CONVERTER

FIELD OF THE INVENTION

The invention relates to a method and a controller for controlling a modular multi-level converter and to a modular multilevel converter system.

BACKGROUND OF THE INVENTION

A modular multi-level converter comprises a plurality of converter cells that are connected in series in each branch of the converter. Each converter cell comprises a capacitor and semiconductor switches for connecting the capacitor to the branch or for disconnecting it therefrom.

Due to the series connection of converter cells, a modular multi-level converter enables AC/DC and DC/AC voltage conversion above the usual upper threshold of about 6 kV AC, which usually is the maximum voltage rating for other power converter topologies. The voltage rating of a modular multi-level converter may reach voltages as high as 20 kV. Thus, a modular multi-level converter docs not require a transformer or complex snubber circuits. Moreover, since the converted power may be increased via a voltage increase, the efficiency of a modular multi-level converter may go up to 99%.

Since each phase of a modular multi-level converter (which usually comprises two branches per phase), comprises a plurality of converter cells, output voltage waveforms of multiple levels may be produced. As the converter cell count increases, the quality of the output voltage waveforms also increases, allowing better approximating sinusoidal voltage waveforms. An operation with low output harmonic distortion of the output voltages and currents is a requirement for most industrial applications, as dictated by various international standards, such as the IEEE 519-1992 and the IEC 61000-3-6.

The series-connected converter cells of a modular multi-level converter may be of relatively low voltage rating, e.g. 1 kV and all converter cells may be identical. Thus, inexpensive semiconductor devices of reduced voltage blocking capability such as 1.7-kV IGBTs may be used. Modularity also enables fault tolerance, as redundant converter cells may be added at low cost.

The high voltage capability, operation at low switching frequency, and modular structure of a modular multi-level converter make it ideal for high-power, medium-voltage industrial applications. However, these advantages come with the increased complexity of control requirements that translate in nontrivial control solutions to guarantee the correct operation of the converter.

A modular multi-level converter is usually controlled by a cascade of control loops: an outer power control loop tracks given reference currents for an active and a reactive power by employing a PI-based decoupled current controller. A current controller provides suitable voltage references for a modulator and an inner balancing control loop which uses the redundancy in the converter states balances the capacitor voltages. The converter cells with lowest capacitor voltage may be prioritized for charging while the converter cells with the highest voltage levels are chosen for discharging currents.

The controller of a modular multi-level converter is usually located physically with the converter and hard-wired with sensors and actuators, increasing the weight, and the space necessary to accommodate the boards of the converter and limiting the computational capability of the controller.

The patent application EP 2515453 A1 discloses a communication system for a power electronic converter made of a plurality of possibly identical converter modules arranged in a converter cabinet and comprising power semiconductor switches or valves. A backbone network carries communication signals between a single, main, central, or higher level converter controller and a plurality of local, or lower level module controllers arranged and/or mounted in the different converter cabinets. The backbone network includes optical fibre which can support high-data rates and are capable of withstanding large voltages.

DESCRIPTION OF THE INVENTION

Model predictive control offers a series of benefits in controlling a modular topology. However, the computational load still may limit the applicability of such a technology. One strategy to overcome the limitations of a controller that is located physically with the system is to control the converter remotely. Remote control systems, however, comprise new challenging sets of problems because instantaneous and perfect signals between controller and converter may not be achievable. The communication medium between the controller and the converter may introduce delays of time-varying and possibly random nature, packet losses and bandwidth limitations. All these may degrade the achievable control performance of the converter system and could even possibly destabilize the process.

It is an objective of the invention to provide a more flexible and more accurate model predictive control schema for a modular multi-level converter under unreliable communication.

This objective is achieved by the subject-matter of the independent claims. Further exemplary embodiments are evident from the dependent claims and the following description.

A first aspect of the invention relates to a method tor controlling a converter, which may be a modular multi-level converter, i.e. a converter with a plurality of converter cells, each cell having a semiconductor switch and a capacitor. In general, a converter may be an electrical device that is adapted to convert a first AC or DC current into a second different AC or DC current, i.e. a current with a different voltage and/or frequency.

According to an embodiment of the invention, the method comprises the steps of: collecting control input variables from the converter; transmitting the control input variables to a controller of the converter via a first communication medium; determining, in the controller, an actual state of the converter and at least one control output variable based on a model of the converter; transmitting the control output variable to the converter via a second communication medium for controlling the converter; wherein the model of the converter accounts for the first and/or the second communication medium.

For example, the method may be implemented in a remote controller (i.e. a controller spatially separated from the converter cells), which communicates with the converters cells via communication media that have a significant impact on the transmitted data. It has to be understood that the controller, which implements the method, may be part of a bigger controller or control system, i.e. may be a distributed inner-loop controller. For example, the converter may comprise a centralized remote controller part or outer-loop controller with a high calculation power and distributed local controller parts or inner-loop controllers located at the converter cells or at modules comprising such cells.

Measurements relating to the converter, such as capacitor voltages, cell voltages, branch currents and/or phase currents, which may be collected by sensors at the converter, may be transmitted via a first communication medium to the controller. The controller processes these control input variables and generates control output variables, such as, for example switching states or gate signals to be directly applied to the converter cells or reference voltages and/or currents to be transmitted to further controller parts or inner-loop controllers. The controller uses a model of the system that comprises a model of the converter and additionally a model of the communication media used for transmitting the control data. Such a model for the converter usually is implemented in the form of one or more mathematical equations that, for example, are based on the topology and physical behavior of the converter. With the model of the system, also a state of the converter may be determined, which, for example, may comprise load currents and circulating currents.

Also the model of the communication medium/media may be implemented with mathematical equations, modeling the delays, quantization of data and/or losses of data.

According to an embodiment of the invention, the model accounts for time-delays for transmitting data m the first and/or second communication medium. For example, the measurement data collected by sensors is received by the controller at a time point later than the measurement time. The controller may shift actual received input control variables back in time, such that they are input to the model with their correct measurement times. Furthermore, the controller may take into account the time for transmitting the control output variables to the cells or to an inner-loop controller, such that they are received at the cells and the inner-loop controller at a time point, they have been calculated for.

According to an embodiment of the invention, the model accounts for constant time delays. For example, the time delays for the first and/or second communication medium may be measured in a design phase of the system. In the case, the time delays of the communication medium are varying, the controller may account for average constant time delays. The model may also account for time varying delays (known and unknown).

According to an embodiment of the invention, actual time delays of the first and/or second communication medium are determined by the controller. For example, when the control input variables are transmitted with data packages, these data packages may be time-stamped with the measurement time of the control input variables and/or with the sending time. Those time-stamps may be used by the controller for determining the time delays.

According to an embodiment of the invention, the model accounts for data losses in the first and/or second communication medium. In the case, a communication medium is based on a protocol that may discard data packages (for example internet protocol or wireless communication protocols) it may be that not all sent control input and/or output variables are received. The controller may account for this, by extrapolating data or by sending more data than necessary (if there would be no data losses).

According to an embodiment of the invention, lost control input values are estimated from the model of the converter, if the data values are lost in the first communication medium. For example, the control method may be based on a prediction method (for example model predictive control) to obtain the input behaviors and the control effect at future instants, compensating for the delays and information losses in the controller application. The model may be supplemented with equations that may be used for predicting actual control input variables from already received past control input values, when the actual control variables are lost.

According to an embodiment of the invention, control output variables for more than one time step in the future are predicted from the model of the converter; wherein control output variables transmitted during a previous time step are used for controlling the converter, if control output variables are lost in the second communication medium. A control method generating a prediction horizon longer than one time step in the future may be used and the complete prediction horizon maybe transmitted to the converter cells or the next inner-loop controllers, which may use actual time steps of a past prediction horizon, when the actual prediction horizon is lost.

According to an embodiment of the invention, the model accounts for quantization of data values in the first and/or second communication medium. The general continues data values of the control input and/or control output variables may be quantized, when they are sampled, digitized and/or compressed for the transmission via a communication medium. For example, a data value in [−1, 1 ] may be mapped to 11 values −1.0, 0.8 , . . . , 0.0, 0.2, . . . 1.0. This mapping of intervals of data to single values may be accounted for by the converter. For example, the converter may only generate control output variables having only the quantized values. Such a quantization may be a model with constraints added to the model of the converter.

According to an embodiment of the invention, the first and/or second communication medium comprises a data communication network. For example, the first and/or second communication medium may be based on Ethernet or in general on a data communication network based on transmitting data packages.

According to an embodiment of the invention, the first and/or second communication medium comprises a wireless communication medium. Alternatively or additionally, power lines of the converter are used as the first and/or second communication medium. In these cases, wiring and/or galvanic isolation may be saved.

A further aspect of the invention relates to a controller tor a converter, which is adapted for performing the method as described in the above and in the following. For example, the method may be implemented on any computational hardware that includes DSPs and FPGAs.

According to an embodiment of the invention, the controller is adapted for: receiving control input variables, which have been transmitted to the controller via a first communication medium; determining an actual state of the converter and at least one control output variable based on a model of the converter; and transmitting the control output variable to a further controller and/or the converter via a second communication medium; wherein the model of the convertor comprises a model of the first and/or the second communication medium.

For example, the controller may be adapted for stabilizing circulating currents and balancing capacitors voltages, while considering time delay, quantization and packet fosses of the communication media used for transmitting control data. The controller may be implemented remotely from the converter or even remotely from the plant of the converter. The controller also may be a pan of a control system dislocated between converter cells and/or modules of the converter.

According to an embodiment of the invention, the controller is a centralized controller, receiving the control input variables directly via the first communication medium from the converter and applying the control output variable directly to the converter via the second communication medium.

According to an embodiment of the invention, the controller comprises at least two cascaded controllers; wherein a first outer-loop controller receives the control input variables, determines the control output variable and sends the control output variable to a second inner-loop controller. For example, the first outer-loop controller may be located remote from the converter and may provide high computational power and the second inner-loop controller may be collocated in the converter cells or in converter modules. For example, the first outer-loop controller may be a centralized controller for power and/or current control. The second inner-loop controller is a local controller for voltage modulation and/or capacitor balancing.

A further aspect of the invention relates to a modular multi-level converter system, which comprises a modular multi-level converter with a plurality of converter cells connected in series in at least one phase with two branches, a controller as described in the above and in the following, a first communication medium for transmitting the control input variables to the controller, and/or a second communication medium for transmitting the control output variable to the converter cells (which may comprise a local controller). The system furthermore may comprise sensors for collecting the control input variables.

It has to be understood that features of the method as described in the above and in the following may be features of the system and the controller as described in the above and in the following.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

In principle, identical parts are provided with the same reference symbols in the figures.

DETAILED DESCRIPTION OF EXEMPLARY EMBODIMENTS

Figure 1:
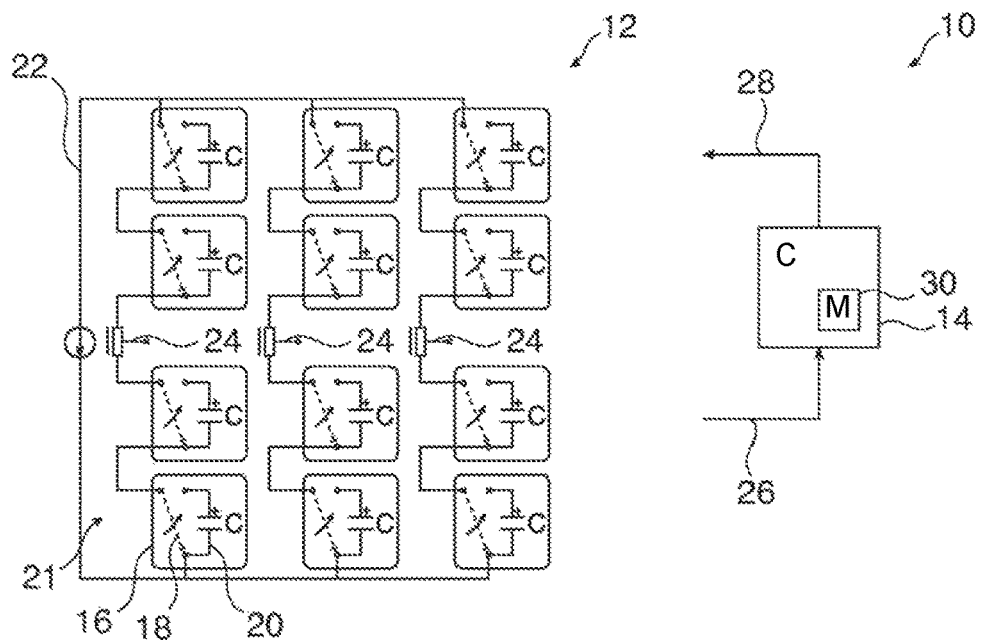
FIG. 1 schematically shows a modular multi-level converter system according to an embodiment of the invention.

FIG. 1 schematically shows a system 10 comprising a modular multi-level converter 12 and its controller 14.

As a specific example, the modular multi-level converter 12 comprises a plurality of converter cells 16, each of which comprises a switch 18 and a capacitor 20, which may be of an electrolytic or film type. The converter cells 16 are connected in series to form branches 21, which are on the one side connected to a DC-link 22 and on the other side to a phase output 24 of the converter 12. With switches 18 (which usually comprise high power semiconductors), the capacitor 20, which acts as a storage element of DC voltage, may be bypassed or inserted into the respective branch 21. Inserting/bypassing the capacitors 20 in the branch 21 allows impressing various voltage levels at the phase outputs 24.

By switching the switches, the converter 12 is adapted for converting a DC voltage at the DC link to an AC voltage at each of the phase outputs 24. The phase outputs 24 of a modular multi-level converter may be connected to a power grid (active front end operation) or to a load (power inverter application).

There are other possible converter topologies for a modular multi-level converter, for example direct converter topologies, which are adapted for directly converting an AC voltage into another AC voltage.

The system 10 furthermore comprises a controller 12 (for example based on a DSP or an FPGA), which receives input control variables 26 from the converter 12 and, optionally, another electrical system the converter is connected to.

For example, the control input variables may be generated by current and/or voltage sensors measuring the respective quantities at the cell capacitors 20, branches 21, DC link, phases 24, or the grid, the converter is connected to. Other control input variables may be generated by a torque and/or speed sensor attached to a drive, which is driven by the converter.

From the control input variables, the converter generates control output variables 28, which, for example, may be the switching states of the switches 18 for the next time step.

The control objective of the controller 14 of the modular multi-level converter 12 usually is to track given active/reactive reference currents as control input variables for active/reactive power control, while keeping the capacitor voltages of the converter cells 16 at their nominal values.

The phase currents (as control input variables 26) usually are measured periodically and controlled to their set point values.

The voltage of each of the capacitors 16 may be controlled around a reference value, which is equal to the voltage of the DC link 22 that feeds the converter 12 divided by the number of converter cells 16 in the branch (half-phase) 21.

Furthermore, internal electrical quantities of the converter, such as branch energies may be controlled.

A characteristic feature for the modular multi-level converter 12 is that each of its phases has two branches 21. The phase output 24 is the common connection point of two adjacent branches 21. Energy exchange between the two branches 21 of the phase is required to allow that current may be produced at the phase output 24. The energy exchange between the branches 21 of a phase may be controlled such that desired current components are generated, while current harmonics that exert stress on the power semiconductors of rive converter cells 16 may be minimized. This objective is sometimes cited as "control of circulating currents".

The controller 14 may be based on a model predictive controls scheme, in which a mathematical model 30 of the converter 12 is used for predicting the control output variables 28 from the control input variables 26, while considering the control objectives.

In general, the dynamics of the modular multi-level converter system 10 may be decomposed in two main dynamics: a 'slow' dynamics of the reactive elements, inductors and capacitors 20, and the 'fast' dynamics of the semiconductor switches 18. This may enable a decoupling between an upper layer control for the slow dynamics that, given the desired current loads, defines the desired voltages on the cells capacitors 20; and a lower layer control for the last dynamics that, given the desired values of cell capacitors voltages 20, determines the switching position to achieve the voltages and guarantee balancing between the different cells.

A general representation of the slow dynamics of the modular multi-level converter 12 may be a nonlinear time-varying model affine in the incontrollable control input variables v (for example a source voltage, see equations below). Such a model 30 may be described by $$dx/dt = A(t,x,u) + Gv$$

$$y = Cx,$$

where the state vector x depends on a specific choice of variables, current and voltages in various combinations. The control output variables u may contain the voltage vector of the capacitors 20 and the exogenous inputs v may be a DC link voltage. The control input variables y, to be controlled may be the load current and the circulating currents.

The 'fast' layer may be a hybrid model, where discrete switch positions of the switches 18 may determine the voltage value of the capacitors 20.

In one case, the control objectives are typically to provide the desired load current while preserving acceptable values of circulating currents which are defined as linear combinations of the phase currents.

Figure 2:
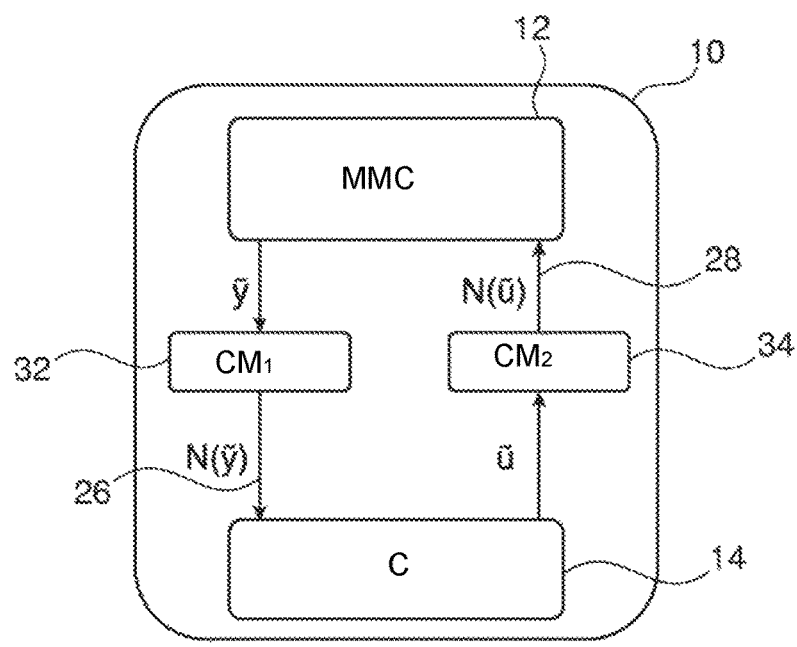
FIG. 2 schematically shows an arrangement of the modular multi-level converter system of FIG. 1 connected via communication media to a remote controller.

As shown in FIG. 2, the controller 14 is communicatively connected to the converter 12 via a first communication medium 32 and a second communication medium 34. The control input variables 26, indicated by the variable y, which are acquired at the converter 12 (or a system connected to the converter 12) are transmitted via the first communication medium 32 to the controller 14. Due to the transport of the data by the first communication medium 32, the control input variables y may be altered in some way, which is indicated by the function N. Similarly, the control output variables 28, indicated by u may be altered by the second communication medium 34, which is again indicated by the function N.

The communication media 32, 34 may be, for example, wireless or wire-bound communication networks. It is also possible that electrical power conductors of the converter 12 are used as communication media 32, 34.

In every model based control, the accuracy of the model 30 plays a key role in determining the performance of the controller 14. When the controller 14 is implemented remotely, the performance may be heavily affected by the properties of the used communication media 32, 34. In particular, the communication media 32 may result in quantization and sampling effects, delays and/or information losses, for example when communication packets are dropped out.

These effects of the communication media 32, 34 may be included info the model 30 of the controller 14.

In particular, a communication medium 32, 34 may be modeled as following: let s(t) be the signal sent across the communication medium 32, 34, i.e. the variables 26, 28 such as load current, reference current, circulating current or capacitor voltages. It may be assumed that normalized value may be used, such that s is defined in [−1 1].

The signal s(t) may then be processed as following due to the transmission via the communication medium 32, 34:

It may be sampled and delayed by a non-constant or constant time T, resulting in s(t−T).

It may be quantized, resulting in q(S(t−T)) where q is the quantizer operator defined as q: [−1,1]→Q={$q_1 \ldots q_N$}. The quantization error E and range R>0 may be defined such that s>R>|q(s)−s|<E.

Finally, a part of the signal information may be lost. A binary variable θ may be defined that may be deterministic or stochastic as θ=0 (data lost) and θ=1 (data received). Then the received signal is q(S(t−T))*θ.

Considering the effects introduced by the communication medium 32, 34, the model 30 accounting for the effects may be represented by $$dx/dt = A(t, x, q(u_{(t-T)}) + Gv$$

$$y = Cq(x(t-T)),$$

wherein $q(u_{k(t-T)})$ are the control output variables 28 that are applied to the converter 12 after being processed via the communication medium 34.

Formulated in another way, the controller 14 may be represented as function F of the values of the state x, control input variables y and exogenous input variables v by $$u = F(q(t-T)), q(y(t-T)), q(v(t-T))).$$

In general the complete controller 14 may be designed using one or more of the following approaches. In a perturbation approach, the signal quantization and delay may be modeled as errors and a "robust" controller may be designed. In a model approach, models may be used to reconstruct the original signals and a controller may be designed based on this estimation. In a predictive approach, delays may be compensated by using predictive techniques.

Figure 3:
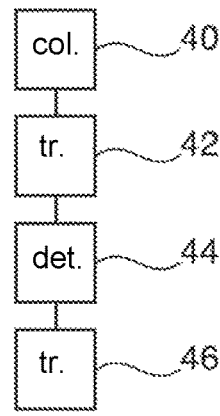
FIG. 3 shows a flow diagram for a method for controlling a modular multi-level converter according to an embodiment of the invention.

FIG. 3 shows a flow diagram for a method for controlling the modular multi-level converter 12.

In step 40, control input variables 26 are collected at the converter and at other systems related to the converter. For example, electrical sensors may collect electrical data from the converter and the grid, the converter is connected to. Other sensors may collect mechanical data such as the speed or the torque of a drive supplied by the converter 12.

In step 42, the collected data is transmitted as control input variables 26 to the controller 14 via the first communication medium 32.

In step 44, the controller 14 determines an actual state of the converter 12 and at least one control output variable 28 based on the model 30 of the converter 12 as described above.

The model 30 may account for time-delays for transmitting data in the first and/or second communication medium 32, 34.

For example, the model 30 may be aware of constant time delays, which for example may have been measured in a test phase of the controller. The received control input variables may be shifted by this constant time delay and/or the generated control output variables may be predicted in such a way, that the constant time delay for sending them to the converter 14 is considered.

Furthermore, the controller 12 may determine non-constant time delays of the first and/or second communication medium 32, 34. For example, the data transmitted via the first and/or second communication medium 32, 34 may be time-stamped when being sent and the controller may determine the time delay by comparing the time-stamp with the time the data was received. The received control input variables may be shifted by the actual non-constant time delay. For the transmitted control output variables 28, a time delay may be predicted from previous time delays and the generated control output variables 28 may be predicted in such a way, that the predicted time delay for sending them to the converter 14 is considered.

Additionally or alternatively, the model 30 may account for data losses in the first and/or second communication medium 32, 34. For example, test control input values 26 may be estimated from the model 30 of the converter 12, if the data values are lost in the first communication medium 32. In other words, if actual measured/collected control input values 26 are available, they are used for evaluating the model, and otherwise they are predicted-estimated from other variables present, for example from previously received control input values 26.

Additionally or alternatively, the model 30 may account for quantization of data values in the first and/or .second communication medium 32, 34. For example, the model 30 may take into account that received control input values 26 may contain a quantization error and/or that transmitted control output values only may have quantized values. For example, the possible values for quantized control output variables 28 may be considered as constraints on the control output variables.

In step 46, the control output variable 28 is transmitted to the converter 12 via the second communication medium 34. The control output variables 28 may comprise the switching states for the switches 18 or may comprise control values (for example the phase voltages) that are input to a further controller that determines the switching states from the received control values.

The system 10 also may account tor data losses in the second communication medium 34. For example, control output variables 28 for more than one time step in the future may be predicted from the model 30 of the converter 1. If control output variables 28 ate lost in the second communication medium 34, then the control output variables 28 already transmitted during a previous time step, which contain also predictions for the actual time step may be used for controlling the converter 12.

In the end, the switching states are applied to the switches 18 of the converter cells 16.

In the following FIG. 4 to 6, embodiments of controller topologies are shown, that are adapted for implementing the method as described above.

In general, the control strategy may be centralized, where a single controller is implemented to generate the gate signal commands (switching states) for the converter cells as control output variables, or decentralized where a plurality of local controllers may be implemented for at least the task of balancing control. In both cases, communication from the controller to the converter or between the converter cells 16 may be achieved via communication media 32, 34.

Figure 4:
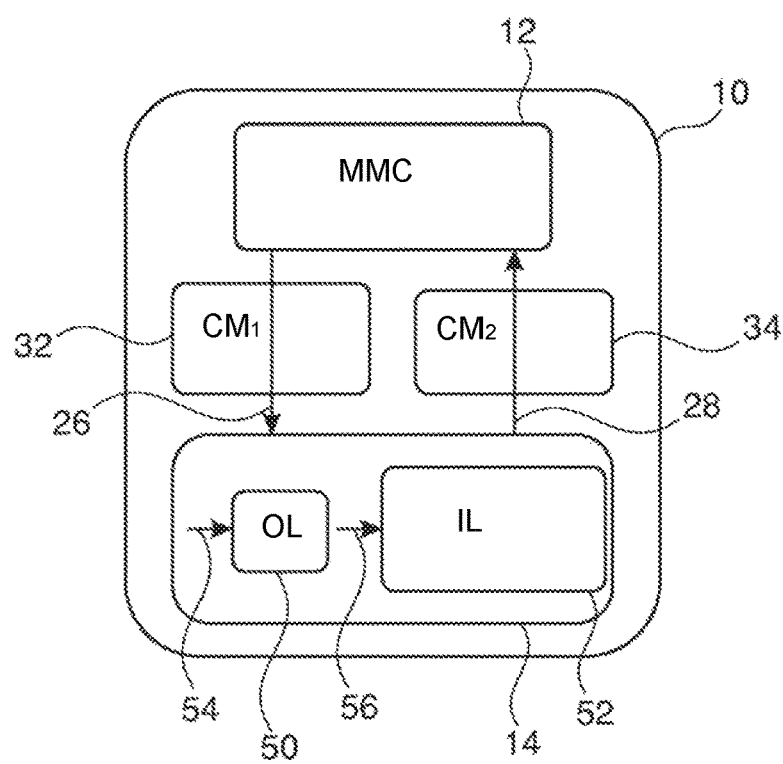
FIG. 4 schematically shows a modular multi-level converter system and its control loops and the communication media between them according to a further embodiment of the invention.

FIG. 4 shows a centralized controller 14 that is implemented remote from the converter 12 that performs all control tasks. i.e. it receives values of the control input variables 26 directly via the first communication medium 32, determines the switching states for the switches 18 as control output variables 28 and applies the switching states directly to the converter 12 via the second communication medium 34. This will enable the implementation of a model predictive controller on a more powerful computing platform that is adapted to the computational complexity and does not experience the space restrictions and environmental exposure (dirt, vibrations, voltage) of a controller located with, or close to, the converter. Network model predictive control accounts for communication issues such as time delay, data loss, or data quantization that may occur in the communication networks to such remote controller location.

In particular, the controller 14 shown in FIG. 4 comprises a power, higher-level, or outer-loop controller 50 and a lower level, or inner-loop controller 52 (both remote from the converter 12). The power controller 50 receives measured branch currents, measured capacitor voltages and measured phase voltages as control input variables 26. The power controller 50 furthermore receives a reference power 54 and determines from the control input variables 26 and the reference power 54 reference capacitor voltages, reference cell voltages and/or reference circulating currents as intermediate reference variables 56 that are input to the inner-loop controller 52, which determines the switching states or gate signals for the converter cells as control output variables 28.

The topology shown in FIG. 4 may be used for a converter 12 with a high number of converter cells 16 (for example more than 500), which may need a controller 14 with a high computational capability. When using a data communication network as communication media 32, 34, the controller 14 may be a remote controller 14. The data communication network 32 may transmit measurement from the sensors to the controller 14 and the control may account for delays, quantization and/or losses in the data communication network 32. lire data communication network 34 may transmit the switching states or gate signals 28 from the controller 14 to the converter Cells 16 and the controller 14 may account for known fixed delays in the data communication network 34.

Figure 5:
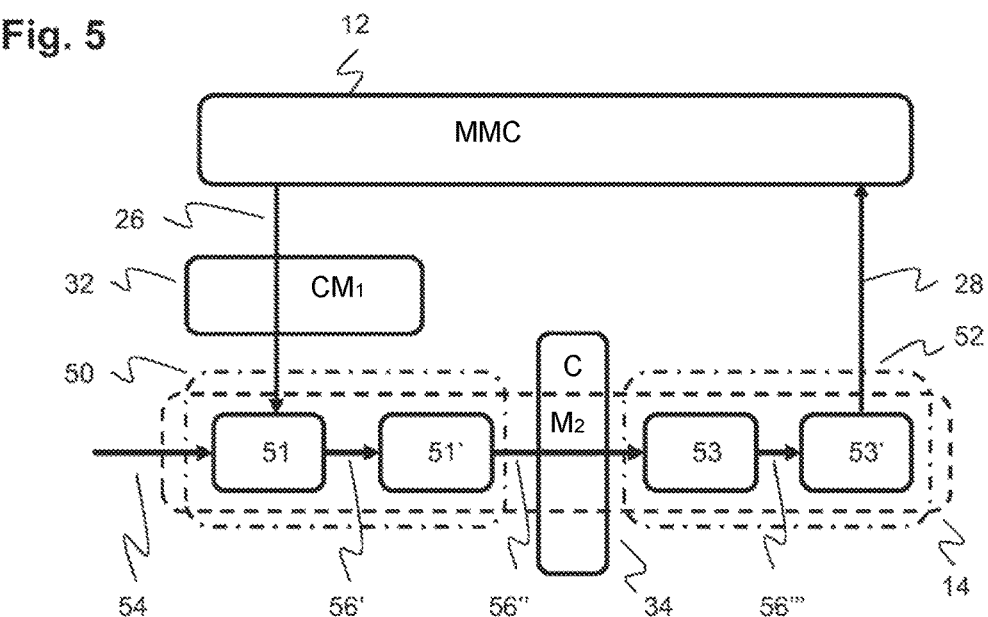
FIG. 5 schematically shows a modular multi-level converter system and its control loops and the communication media between them according to a further embodiment of the invention.

FIG. 5 shows a system 10 with a controller 14 that has a topology with cascaded controllers 51, 51', 53, 53'. The power controller 51 receives measured branch currents, measured capacitor voltages and measured phase voltages as control input variables 26. The power controller 51 furthermore receives a reference power 54 and determines from the control input variables 26 and the reference power 54 reference load currents and reference circulating currents as first intermediate reference variables 56' that are input to the current controller 51'. The current controller determines reference cell or capacitor voltages as second intermediate reference variable 56". The reference capacitor voltages are transmitted via the communication media 34 to a modulator 53, which determines reference phase voltages as third intermediate reference variable 56'". The reference phase voltages are input to a balancing controller 53', which determines the switching states or gate signals as the control output variables 28 for the converter cells.

The power controller 51 and the current controller 51' are remotely located from the converter 12 while the modulator 53 and balancing controller 53' are collocated with the converter 12. Measured signals such as currents and voltages may be sent from local sensors as control input variables 26 to the controller 51 via a wireless communication network 32. The controller parts 51, 51' are implemented on a remote unit with the required computational power. The second intermediate reference variable 56", i.e. the cell or capacitor voltage reference for the modulator and balancing controller, is then sent from the current controller 51' via a wireless communication medium 34 to the modulator 53. The control output variables 28 finally are sent to the converter 12 via local wire-based communication means.

In the foregoing, the remote power and current controllers 51, 51' are part of the higher-level controller 50 for slow system dynamics and implementing the outer, preferably model-predictive, control loop, while a plurality of decentralized modulator and balancing controllers 53, 53' are part of lower-level cabinet, module, or cell controllers 52 for the fast system dynamics and implementing the inner control loop. The interaction between the higher and the lower level controls occurs at a rate that is supported by the second communication media 34. The upper level controller 50 is located remotely from the power conducting converter parts (at voltages in excess of 1 kV) in some central control station, The upper-level controller 50 is preferably located in a clean, vibration-less and easy-to-access space and connected to a cooling system at ground or earth potential. Upper-level control may be implemented on one or on a network of several computers providing control inputs to several converters distributed in the field. Upper level control may include network model predictive control NMPC of the converter, wherein the model is respective of any shortcomings such as time delay, data loss, or data quantization that may occur in the communication media 34 interconnecting the higher-level converter controller 50 and a plurality of local lower-level cabinet, module, or cell controllers 52.

Figure 6:
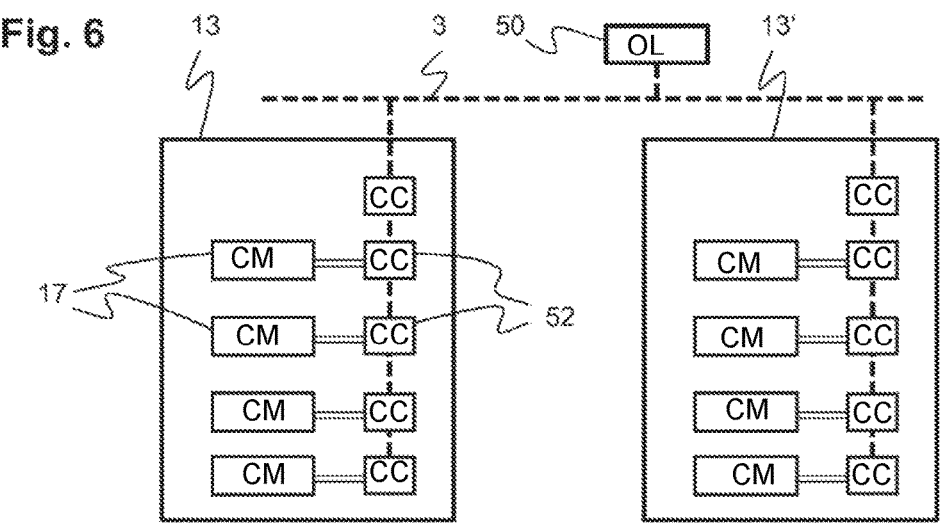
FIG. 6 schematically shows a modular multi-level converter with a plurality of converter modules arranged in two cabinets according to a further embodiment of the invention.

FIG. 6 schematically shows a modular power electronic converter with two cabinets 13, 13' in each of which a plurality of converter modules 17 are mounted. In the context of the present specification, the term cabinet designates a separable part of the converter with a supporting frame and a dedicated cabinet housing and power supply. The converter modules 17 comprise one to four converter cells with power electronic semiconductor switches or valves that are adapted to switch large currents flowing at voltages in excess of 1 kV in power conductors (not shown) of the converter branches. A backbone communication network 3 carries communication signals between a higher-level converter controller 50 and a plurality of local lower-level cabinet, module, or cell controllers 52. The higher level converter controller 50 is arranged outside the cabinets 13, 13' comprising the modules, i.e. in a separate cabinet or otherwise remote from the local controllers. The backbone communication network 3 includes communication media 32 and 34 of wireless or power conductor based type.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for controlling a modular multi-level converter having a plurality of converter switches connected in series in at least one phase, the method comprising the steps of:
   collecting control input variables from the converter;
   transmitting the control input variables to a higher-level controller of a controller of the converter via a first communication medium;
   determining, in the higher-level controller and based in a model of the converter, at least one intermediate reference variable for controlling the converter;
   transmitting the intermediate reference variable via a second communication medium to a lower-level controller of the controller;
   determining, by the lower-level controller, a control output variable from the intermediate reference variable to be sent to the converter switches;
   wherein the model of the converter accounts for time delay, data loss, or data quantization occurring in the first and/or the second communication medium;
   wherein the higher-level controller is a model predictive controller respective of time delay, data loss, or data quantization occurring in the second communication medium;
   wherein the higher-level controller is a centralized controller for power and/or current control;
   wherein the lower-level controller is a local controller for voltage modulation and/or capacitor balancing;
   controlling the switching states of the plurality of converter switches in response to receiving the control output variable.

2. The method of claim 1,
   wherein the modular multi-level converter has a cabinet with a plurality of converter modules interconnected through power conductors, and wherein the higher-level controller is arranged outside the cabinet and/or connected to ground potential.

3. The method of claim 1,
   wherein the model accounts for actual time-delays for transmitting data in the first and/or second communication medium determined by the controller.

4. The method of claim 1,
   wherein the model accounts for data losses in the first and/or second communication medium.

5. The method of claim 4,
   wherein lost control input values are estimated from the model of the converter, if the data values are lost in the first communication medium.

6. The method of claim 4,
   wherein control output variables for more than one time step in the future are predicted from the model of the converter;
   wherein control output variables transmitted during a previous time step are used for controlling the converter, if control output variables are lost in the second communication medium.

7. The method of claim 1,
   wherein the model accounts for quantization of data values in the first and/or second communication medium.

8. The method of claim 1,
   wherein the first and/or second communication medium comprises a data communication network; and
   wherein the first and/or second communication medium comprises a wireless communication medium.

9. The method of claim 1,
   wherein power conductors of the converter are used as the first and/or second communication medium.

10. A controller for a converter having a plurality of converter switches connected in series in at least one phase, the controller having a higher-level controller and a lower-level controller, the controller being adapted for:

receiving control input variables, which have been transmitted to the higher-level controller via a first communication medium;
determining, in the higher-level controller and based on a model of the converter, at least one intermediate reference variable for controlling the converter;
transmitting the intermediate reference variable via a second communication medium to the lower-level controller of the controller;
determining, by the lower-level controller, a control output variable from the intermediate reference variable to be sent to the converter switches;
wherein the model of the converter accounts for time delay, data loss, or data quantization occurring in the first and/or the second communication medium;
wherein the higher-level controller is a model predictive controller respective of time delay, data loss, or data quantization occurring in the second communication medium;
wherein the higher-level controller is a centralized controller for power and/or current control;
wherein the lower-level controller is a local controller for voltage modulation and/or capacitor balancing;
controlling the switching states of the plurality of converter switches in response to receiving the control output variable.

11. The controller of claim 10, wherein the higher-level controller is a centralized controller, receiving the control input variables directly via the first communication medium from the converter.

12. The controller of claim 10, wherein the converter has a cabinet with a plurality of converter modules interconnected through power conductors, and wherein the higher-level controller is arranged outside the cabinet and/or connected to ground potential.

13. A modular multi-level converter system, comprising:
a modular multi-level converter with a plurality of converter cells connected in series in at least one phase;
a controller having a higher-level controller and a lower-level controller, the controller operable to receive control input variables, which have been transmitted to the higher-level controller via a first communication medium;
determine, in the higher-level controller and based on a model of the converter, at least one intermediate reference variable for controlling the converter;
transmitting the intermediate reference variable via a second communication medium to the lower-level controller of the controller;
determining, by the lower-level controller, a control output variable from the intermediate reference variable;
wherein the model of the converter accounts for time delay, data loss, or data quantization occurring in at least one of the first and the second communication medium;
wherein the higher-level controller is a model predictive controller respective of time delay, data loss, or data quantization occurring in the second communication medium;
wherein the higher-level controller is a centralized controller for power and/or current control;
wherein the lower-level controller is a local controller for voltage modulation and/or capacitor balancing;
the first communication medium for transmitting the control input variables to the higher-level controller of the controller;
the second communication medium for transmitting the intermediate reference variable from the higher-level controller to the lower-level controller to determine the control output variable to be sent to the converter cells; and
controlling the switching states of the plurality of converter cells in response to receiving the control output variable.

* * * * *